United States Patent [19]

Kurita

[11] Patent Number: 5,276,571
[45] Date of Patent: Jan. 4, 1994

[54] CASSETTE TAPE PLAYER

[75] Inventor: Kazuhito Kurita, Tokyo, Japan
[73] Assignee: Sony Corporation, Tokyo, Japan
[21] Appl. No.: 782,649
[22] Filed: Oct. 25, 1991
[30] Foreign Application Priority Data

Nov. 1, 1990 [JP] Japan .................................. 2-293697

[51] Int. Cl.$^5$ .............................................. H04N 7/18
[52] U.S. Cl. .................................. 360/96.1; 360/96.2
[58] Field of Search .................... 360/96.1, 96.4, 96.3, 360/105, 96.2

[56] References Cited

U.S. PATENT DOCUMENTS 4,626,940  12/1986  Kobayashi ........................ 360/96.3

Primary Examiner—Edward P. Westin
Assistant Examiner—T. Davenport
Attorney, Agent, or Firm—Lewis H. Eslinger; Jay H. Maioli

[57] ABSTRACT

A cassette tape player for use with a tape housed in a cassette for recording and/or reproducing the tape. The cassette is generally provided with two capstan insert holes, two guide holes formed between the two capstan insert holes, two pinch roller insert openings respectively contiguous to the two capstan insert holes, two openings respectively contiguous to the two guide holes, and a magnetic head insert opening formed between the two openings. The cassette tape player includes a reversibly rotatable capstan adapted to be inserted into one of the two guide holes; a pinch roller adapted to be inserted through one of the two openings corresponding to the guide hole into which the capstan is to be inserted; a first magnetic head for use in normal running of the tape adapted to be inserted through one of the pinch roller insert openings so that the first magnetic head is located on a supply reel side upstream of the capstan in the normal running; and a second magnetic head for use in reverse running of the tape adapted to be inserted through the magnetic head insert opening so that the second magnetic head is located on a supply reel side upstream of the capstan in the reverse running. Thus, the magnetic head to be used in the recording or reproducing operation is located always on the supply reel side upstream of the capstan.

4 Claims, 16 Drawing Sheets

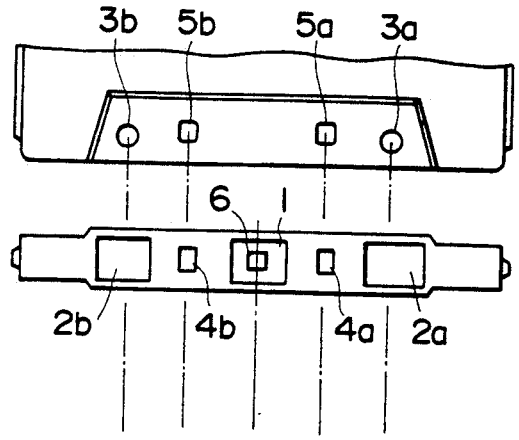
FIG. 3A PRIOR ART
ONE-WAY PLAYBACK-ONLY TYPE
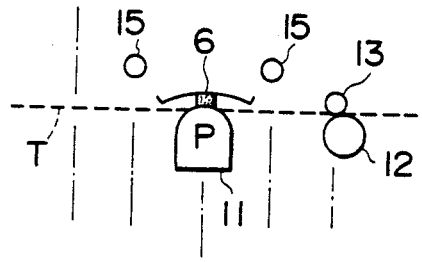
FIG. 3B PRIOR ART
ONE-WAY RECORD/PLAYBACK TYPE
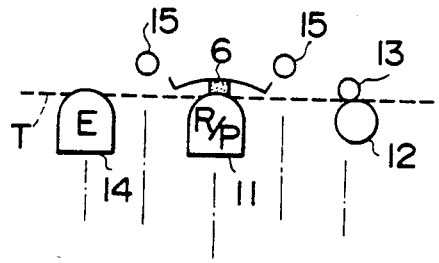
FIG. 3C PRIOR ART
REVERSIBLE PLAYBACK-ONLY TYPE
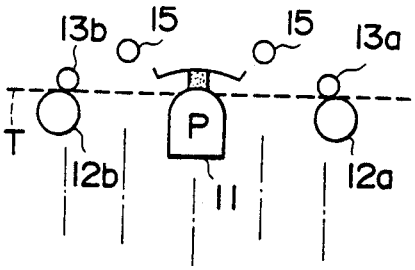
FIG. 3D PRIOR ART
REVERSIBLE RECORD/PLAYBACK TYPE
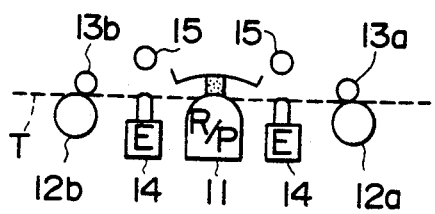
RVS ←——→ FWD

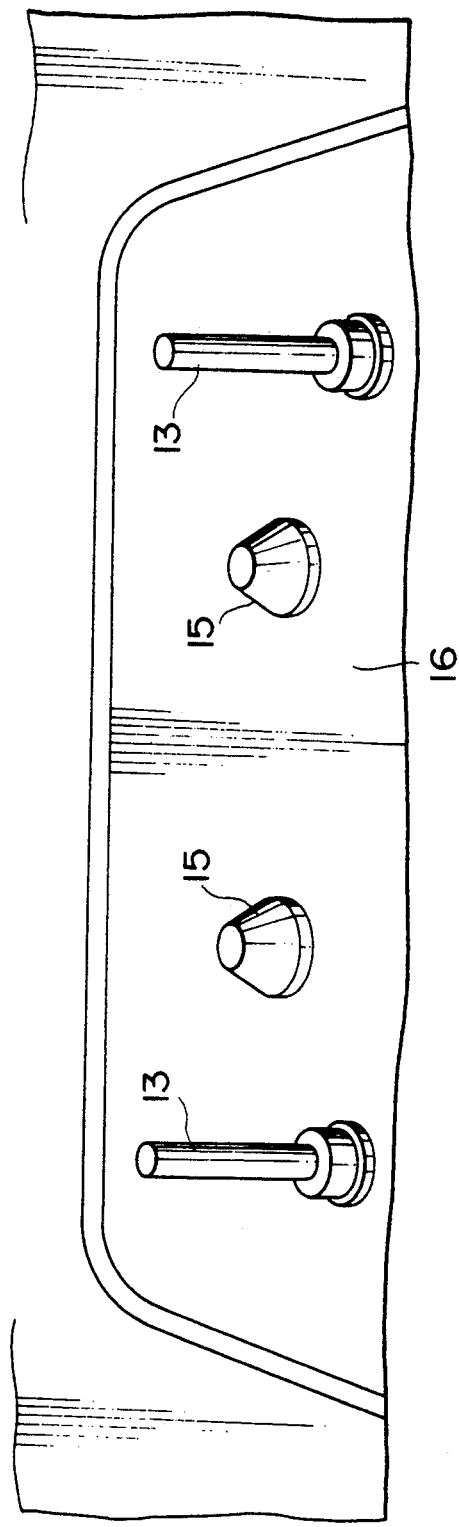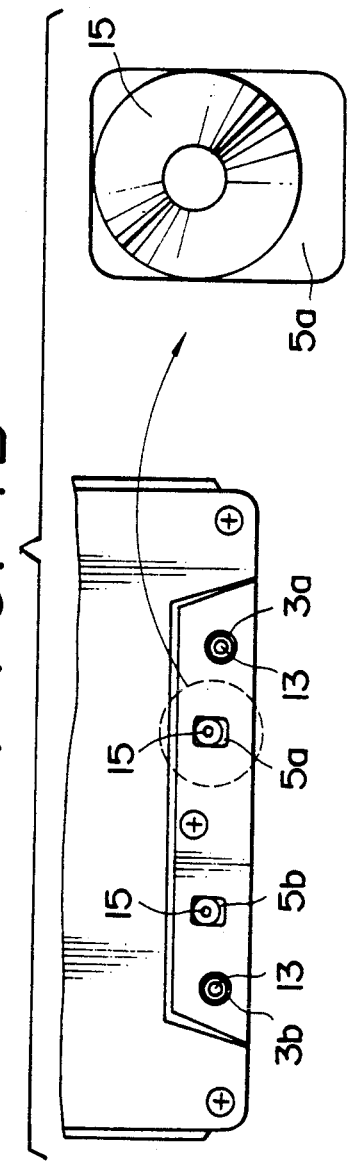

REVERSIBLE PLAYBACK-ONLY TYPE

REVERSIBLE RECORD/PLAYBACK TYPE

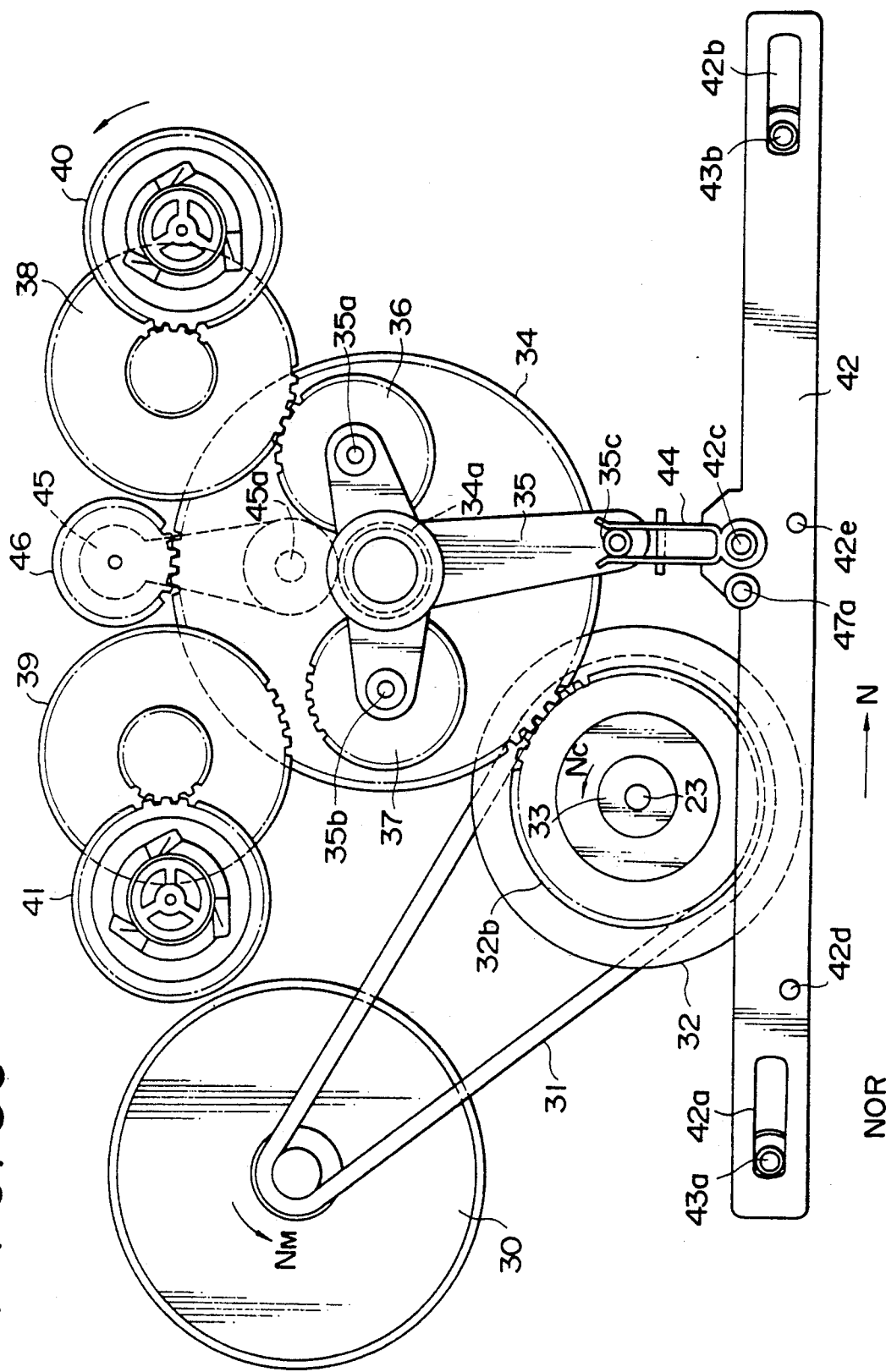

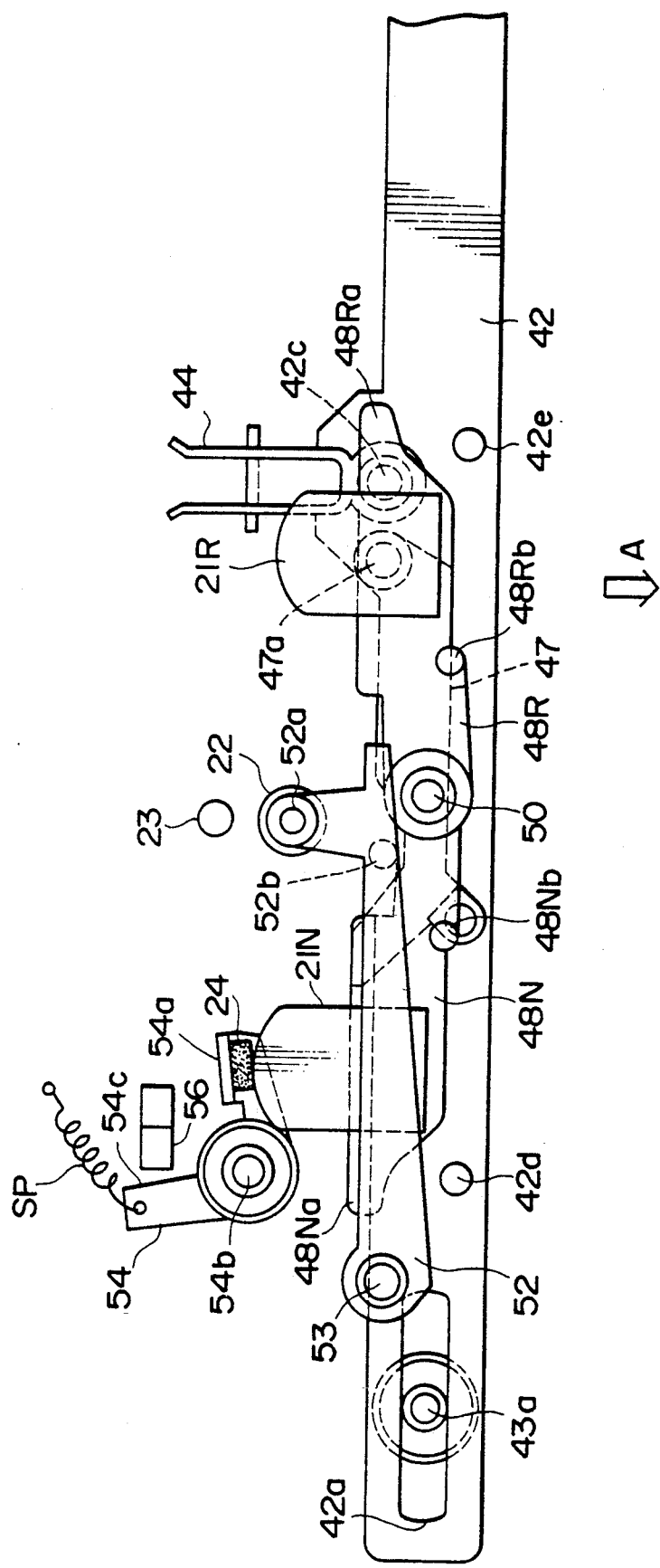

STOP. FF. REW

NOR

RVS

STOP
FF. REW

NOR

RVS

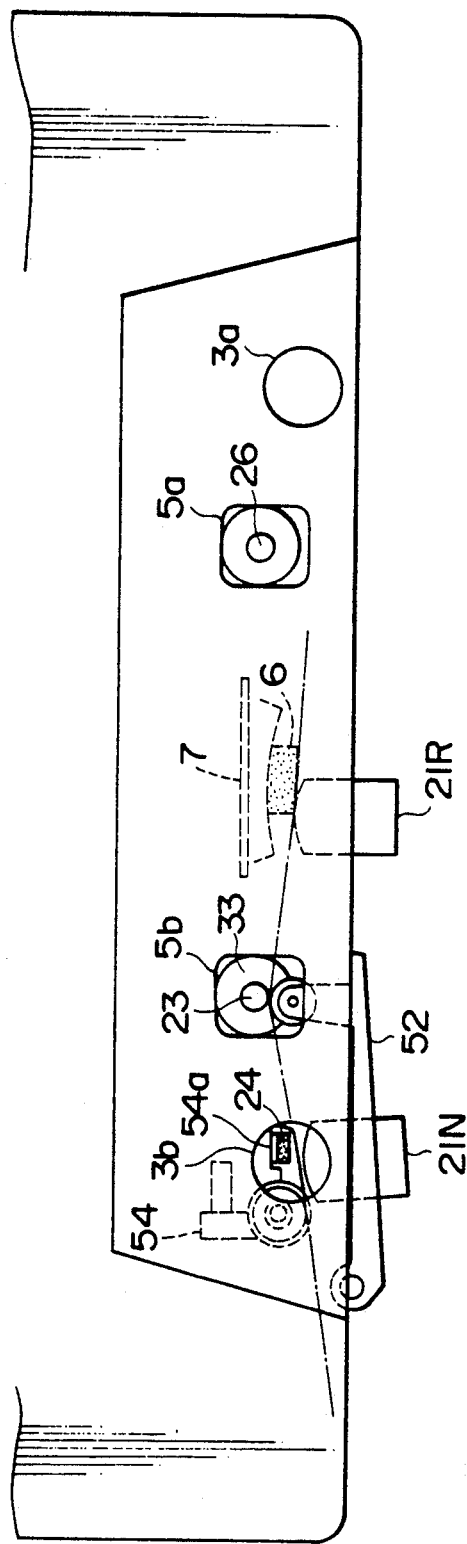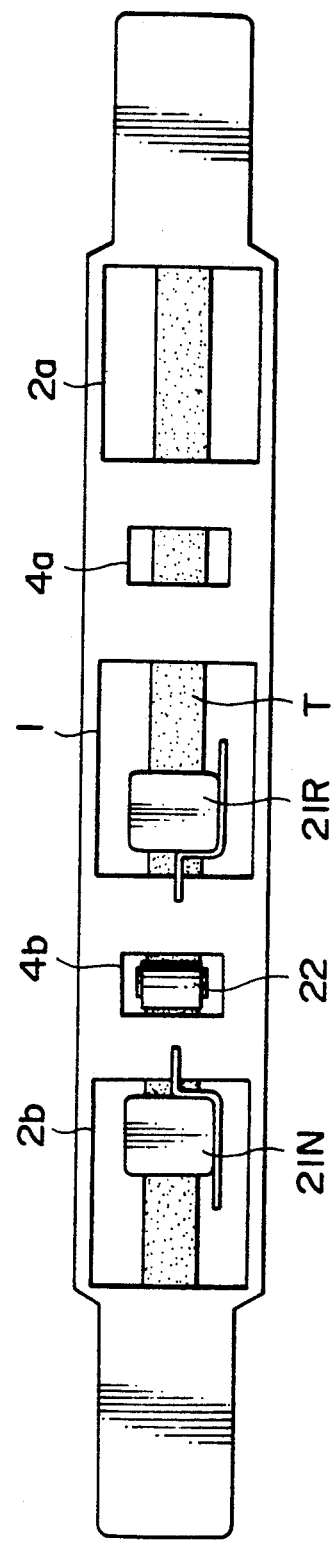

CASSETTE TAPE PLAYER

BACKGROUND OF THE INVENTION

The present invention relates to a cassette tape player for recording and/or reproducing a compact cassette tape.

FIG. 1 shows a known compact cassette tape (which will be hereinafter referred simply to as a cassette) in perspective. As well known in the art, such a cassette has a standardized construction including a magnetic head insert opening 1 adapted to receive a magnetic head upon loading the cassette into a cassette tape player, two pinch roller insert openings 2a and 2b adapted to receive two pinch rollers (and erasing heads in some kinds of cassette tape player), two capstan insert holes 3a and 3b adapted to receive two capstans, two openings 4a and 4b adapted to receive two erasing heads particularly in a reversible record/playback type cassette tape player, and two guide holes 5a and 5b adapted to receive two guide projections. Further, there is provided a pad 6 inside the magnetic head insert opening 1 in such a manner as to be urged toward a tape T.

FIG. 2 is an exploded view of the cassette shown in FIG. 1. As shown in FIG. 2, a magnetic shielding plate 7 is provided behind the pad 6 inside the magnetic head insert opening 1, so as to obtain a magnetic shielding effect.

FIGS. 3A to 3D schematically show head mounting sections in different types of conventional cassette tape players in relation to the above-mentioned cassette. As apparent from FIGS. 3A to 3D, the openings and the holes of the cassette are differently used depending upon the types of the cassette tape players. More specifically, the cassette tape player shown in FIG. 3A is of a one-way playback-only type including a magnetic head (reproducing head) 11, a pinch roller 12, a capstan 13, and two guide projections 15. The cassette tape player shown in FIG. 3B is of a one-way record/playback type including a magnetic head (recording/reproducing head) 11, a pinch roller 12, a capstan 13, an erasing head 14, and two guide projections 15. The cassette tape player shown in FIG. 3C is of a reversible playback-only type including a magnetic head (reproducing head) 11, two pinch rollers 12a and 12b, two capstans 13a and 13b, and two guide projections 15. The cassette tape player shown in FIG. 3D is of a reversible record/playback type including a magnetic head (recording/reproducing head) 11, two pinch rollers 12a and 12b, two capstans 13a and 13b, two erasing heads 14, and two guide projections 15.

In general, the reproducing head or the recording/reproducing head in the head mounting section is adapted to be inserted into the magnetic head insert opening 1 of the cassette and be brought into pressure contact with the tape T by utilizing the pad 6.

The two guide projections 15 are adapted to be inserted into the guide holes 5a and 5b of the cassette. As shown in FIG. 4A, each guide projection 15 is formed on a chassis 16 of the cassette tape player, and has a substantially conical shape, for example. As shown in FIG. 4B, when the cassette is loaded into the cassette tape player, the two guide projections 15 are inserted into the rectangular guide holes 5a and 5b in such a manner that a cylindrical portion of each guide projection 15 contacts an inner wall surface of the corresponding guide hole 5a (5b) at three points, thereby positioning the cassette in the head mounting section.

In the reversible type cassette tape player as shown in FIGS. 3C and 3D, the two pinch rollers 12a and 12b and the two capstans 13a and 13b are used for constant-speed running of the tape in a forward (normal) direction and a reverse direction. However, in consideration of a reduction in number of parts, lightness in weight, compactness, singularity of a motor, and simplicity of a drive transmitting system in the cassette tape player, it is preferable to adopt a so-called single capstan reversible type such that a single capstan and a single pinch roller cooperating therewith are employed to drive the tape T in both the normal and reverse directions.

In this circumstance, there has been proposed a single capstan reversible type cassette tape player constructed by removing the capstan 13b and the pinch roller 12b from the construction shown in FIGS. 3C and 3D and adopted the capstan 13a and the pinch roller 12a so that the capstan 13a can be driven in both the normal and reverse directions.

However, in such a single capstan reversible type cassette tape player as proposed above, there occurs a serious problem in practical use such that while the tape T fed by the capstan 13a in the reverse running is recorded or reproduced by the magnetic head 11, the travel of the tape T as well as the tape path becomes unstable, and the tape T is apt to stick to the magnetic head 11.

To solve this problem, it has been proposed to increase a take-up torque in the reverse running. However, this technique is not effective and causes a problem in practical use such that power consumption increases and wow/flutter also increases (particularly, since a component in a take-up system is not blocked by the pinch roller and the capstan, it is more disadvantageous to increase the take-up torque).

SUMMARY OF THE INVENTION

It is accordingly an object of the present invention to provide a cassette tape player of a single capstan reversible type which can always maintain stable travel of a tape in a cassette in both the normal running and the reverse running.

It is another object of the present invention to provide a cassette tape player of a single capstan reversible type which can ensure a proper contact pressure of a magnetic head with respect to a tape in a cassette during a recording and/or reproducing operation.

According to the present invention, there is provided in a cassette tape player for use with a tape in a cassette for recording and/or reproducing the tape, the cassette having two capstan inser holes, two guide holes formed between the two capstan insert holes, two pinch roller insert openings respectively contiguous to said two capstan insert holes, two openings respectively contiguous to said two guide holes, and a magnetic head insert opening formed between the two openings; comprising a reversibly rotatable capstan adapted to be inserted into one of the two guide holes; a pinch roller adapted to be inserted through one of the two openings corresponding to the guide hole into which the capstan is to be inserted; a first magnetic head for use in normal running of the tape adapted to be inserted through one of the pinch roller insert openings so that the first magnetic head is located on a supply reel side upstream of the capstan in the normal running direction; and a second magnetic head for use in reverse running of the tape adapted to be inserted through the magnetic head insert opening so that the second magnetic head is located on a supply reel side upstream of the capstan in the reverse running direction.

In the above construction, it is preferable that the cassette tape player further comprises a bearing for supporting the capstan, the bearing has a shape capable of positioning the cassette in inserting the capstan into the guide hole.

It is also preferable that the cassette tape player further comprises a head pad adapted to be inserted into one of the two capstan insert holes corresponding to the pinch roller insert opening through which the first magnetic head is to be inserted; and a head pad lever for mounting the head pad. In this construction, it is further preferable that the head pad lever is formed of a magnetic shielding material.

As described above, the cassette tape player according to the present invention is of a single capstan reversible type such that reverse running of the tape can be effected with use of a single capstan. The magnetic head to be used for recording and/or production is located always on the supply reel side upstream of the capstan. Accordingly, tape running can be always made stable irrespective of the normal running or the reverse running, and it is therefore possible to put a single capstan reversible type cassette tape player into practical use. That is, various advantages of the single capstan reversible type such as low cost, low power consumption, lightness in weight, and compactness can be actually embodied in a cassette tape player.

Furthermore, in the cassette tape player according to the present invention, a second magnetic head is adapted to be inserted from a pinch roller insert opening of a cassette, and a head pad is inserted into a capstan insert hole contiguous to the pinch roller insert opening so as to face the magnetic head inserted from the pinch roller insert opening. Accordingly, the magnetic head is pressed against the head pad with the tape nipped therebetween to provide proper contact pressure of the magnetic head with respect to the tape during the recording or reproducing operation.

Additionally, since the head pad lever supporting the head pad is made of a magnetic shielding material, a shielding effect to the magnetic head inserted from the pinch roller insert opening can be obtained.

Other objects and features of the invention will be more fully understood from the following detailed description and appended claims when taken with the accompanying drawings.

BRIEF DESCRIPTION OF THE DRAWINGS

FIGS. 3A to 3D are schematic illustrations of head mounting sections in conventional cassette tape players of different types in relation to the cassette;

FIGS. 4A and 4B are illustrations of guide projections for guiding the cassette in a conventional cassette tape player;

FIGS. 7A and 7B are a plan view and a side view of the head mounting section in the preferred embodiment shown in FIG. 5A, respectively;

FIGS. 11A and 11B are illustrations of a positional relation between the head mounting section and the cassette loaded thereinto.

DETAILED DESCRIPTION OF THE PREFERRED EMBODIMENTS

Figures 5A, 5B:
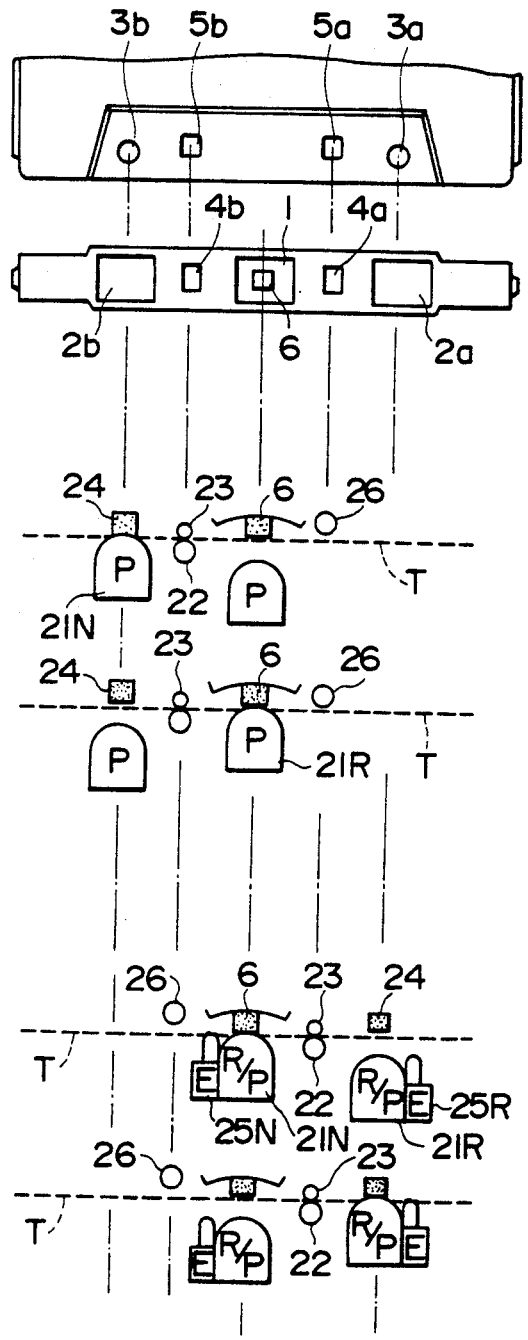
FIGS. 5A and 5B are schematic illustrations of head mounting sections in cassette tape players of a reversible playback-only type and a reversible record/playback type, respectively, according to the present invention in relation to the cassette.

FIGS. 5A and 5B show the concept of the present invention, in which FIG. 5A is a schematic illustration of a preferred embodiment applied to a reversible playback-only type cassette tape player, and FIG. 5B is a schematic illustration of a preferred embodiment applied to a reversible record/playback type cassette tape player. In the preferred embodiment shown in FIG. 5A, a second reproducing head is provided so as to be inserted into the pinch roller insert hole 2b of the cassette. In the preferred embodiment shown in FIG. 5B, a second recording/reproducing head is provided so as to be inserted through the pinch roller insert hole 2a. Each of the types shown in FIGS. 5A and 5B is a single capstan reversible type such that a single reversibly rotatable capstan is provided so as to realize a tape running at a constant speed not only in a normal direction but also in a reverse direction in recording and/or reproducing a tape in the cassette.

Each type of cassette tape player shown in FIGS. 5A and 5B includes a magnetic head 21N for normal running (which will be hereinafter referred to as a normal head 21N), a second magnetic head 21R for reverse running (which will be hereinafter referred to as a reverse head 21R), a pinch roller 22, a capstan 23, a pad 24, and a guide projection 26. In particular, the cassette tape player of the type shown in FIG. 5B further includes two erasing heads 25N and 25R for normal running and reverse running, respectively.

In the reversible playback-only type shown in FIG. 5A, when the cassette is loaded into the cassette tape player of this type, the capstan 23 is inserted into the guide hole 5b, and the pad 24 is inserted into the capstan insert hole 3b.

In reproduction, the pinch roller 22 is inserted into the opening 4b, and the tape T is nipped under pressure between the capstan 23 and the pinch roller 22 to be fed by rotation of the capstan 23 at a constant speed. In the normal running reproduction, the normal head 21N is inserted into the pinch roller insert opening 2b, while in the reverse running reproduction, the reverse head 21R is inserted into the magnetic head insert opening 1.

As mentioned above, in the normal running reproduction, the normal head 21N is inserted into the pinch roller insert opening 2b, and the pad 24 is inserted in the capstan insert hole 3b which is contiguous to the pinch roller insert opening 2b. Accordingly, also in the normal running reproduction, the tape T is nipped between the normal head 21N and the pad 24, thereby effecting a reproducing operation with acceptable head pressure.

In the reversible record/playback type shown in FIG. 5B, each of the normal head 21N and the reverse 21R is a recording/reproducing head which is commonly used as a recording head and a reproducing head.

When the cassette is loaded into the cassette tape player of this type, the capstan 23 is inserted into the guide hole 5a, and the pad 24 is inserted into the capstan insert hole 3a. In recording or reproduction, the pinch roller 22 is inserted into the opening 4a. In the normal running recording or reproduction, the normal head 21N (and the erasing head 25N in case of recording) is inserted into the magnetic head insert opening 1, while in the reverse running recording or reproduction, the reverse head 21R (and the erasing head 25R in case of recording) is inserted into the pinch roller insert opening 2a.

As mentioned above, in the reverse running recording or reproduction, the reverse head 21R is inserted into the pinch roller insert opening 2a, and the pad 24 is inserted in the capstan insert hole 3a which is contiguous to the pinch roller insert opening 2a. Accordingly, also in the reverse running recording or reproduction, the tape T is nipped between the reverse head 21R and the pad 24, thereby effecting a recording or reproducing operation with acceptable head pressure.

As apparent from FIGS. 5A and 5B, a head mounting section of the cassette tape player of the single capstan reversible type according to the present invention is constructed so that the single capstan 23 is adapted to be inserted into the guide hole 5a or 5b, and thereby the normal head 21N for use in the normal running is located on a supply reel side upstream of the capstan 23 in the normal running, while the reverse head 21R for use in the reverse running is located on a supply reel side upstream of the capstan 23 in the reverse running. In other words, the capstan 23 is located always on a take-up reel side downstream of the magnetic head, thereby always ensuring stable running of the tape T. Further, a second reproducing head or recording/reproducing head is adapted to be inserted into the pinch roller insert opening 2a or 2b rather than the magnetic head insert opening 1, and the pad 24 is inserted into the capstan insert hole 3a or 3b corresponding to the opening 2a or 2b, so as to make the tape T contact the magnetic head inserted from the opening 2a or 2b, thereby ensuring reliable recording or reproduction similar to the case that the reproducing head or the recording/reproducing head is inserted into the magnetic head insert opening 1.

Now, there will be described a preferred embodiment of the cassette tape player of the reversible playback-only type corresponding to the conceptional illustration shown in FIG. 5A.

Figure 1:
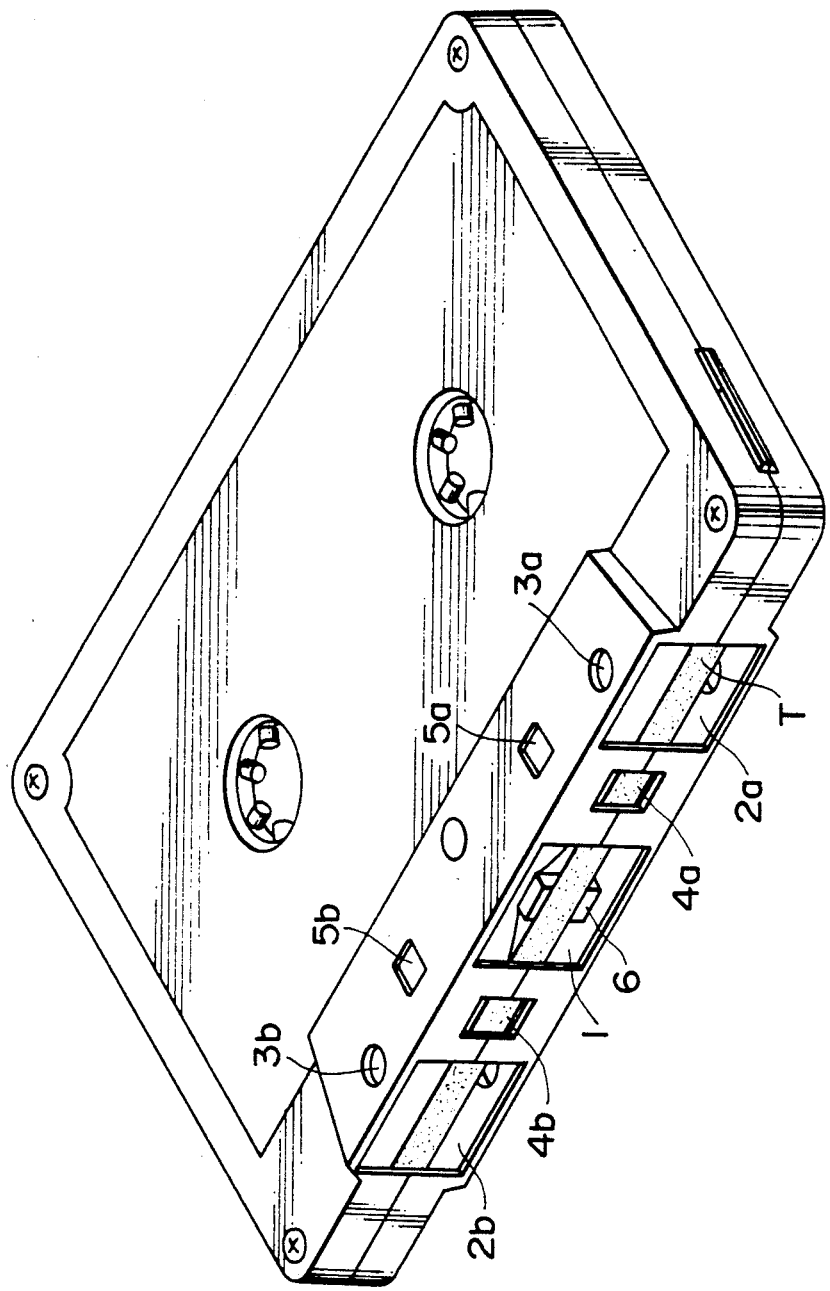
FIG. 1 is a perspective view of a conventional cassette.
Figure 2:
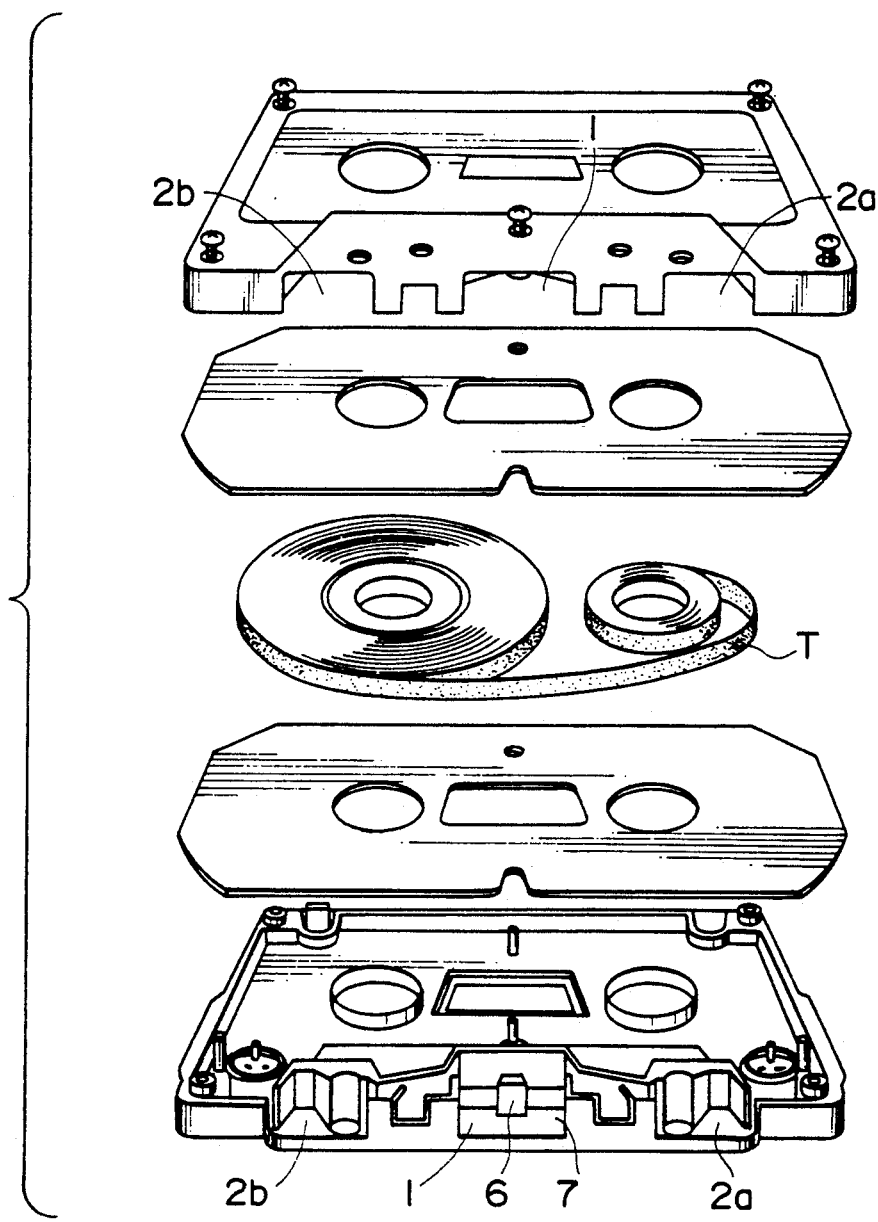
FIG. 2 is an exploded perspective of the cassette shown in FIG. 1.
Figure 6A:
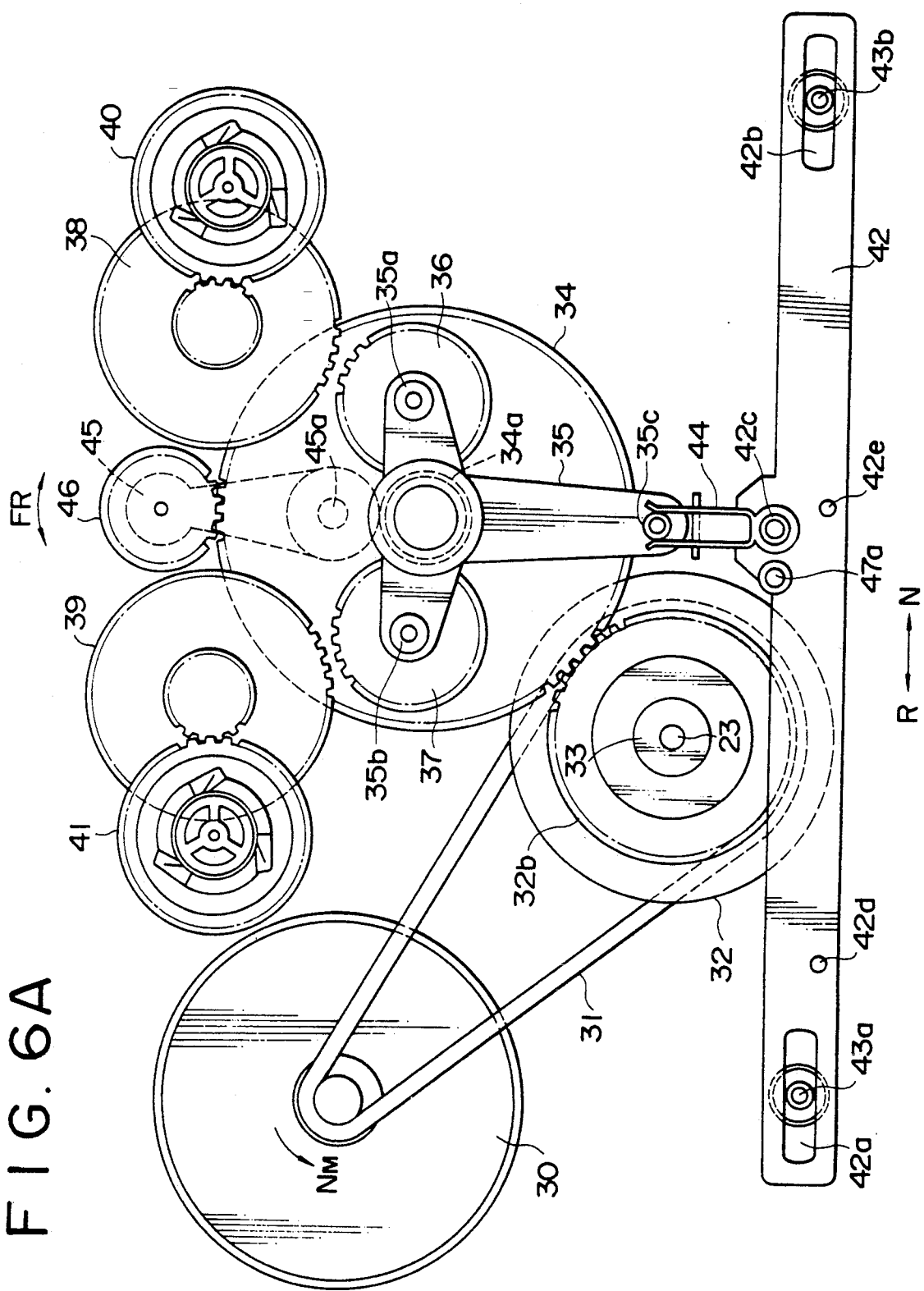
FIGS. 6A and 6D are illustrations of the construction and the operation of a drive transmitting system in the preferred embodiment shown in FIG. 5A.

FIG. 6A schematically shows a drive transmitting system in the cassette tape player according to the preferred embodiment. Referring to FIG. 6A, the drive transmitting system includes a reversible motor 30, a belt 31, a flywheel 32, and a bearing 33, so that the capstan 23 is reversibly rotated at a constant speed in a so-called belt drive fashion. The capstan 23 is located at a position where it is inserted into the guide hole 5b upon loading the cassette shown in FIG. 1.

Figure 6B:
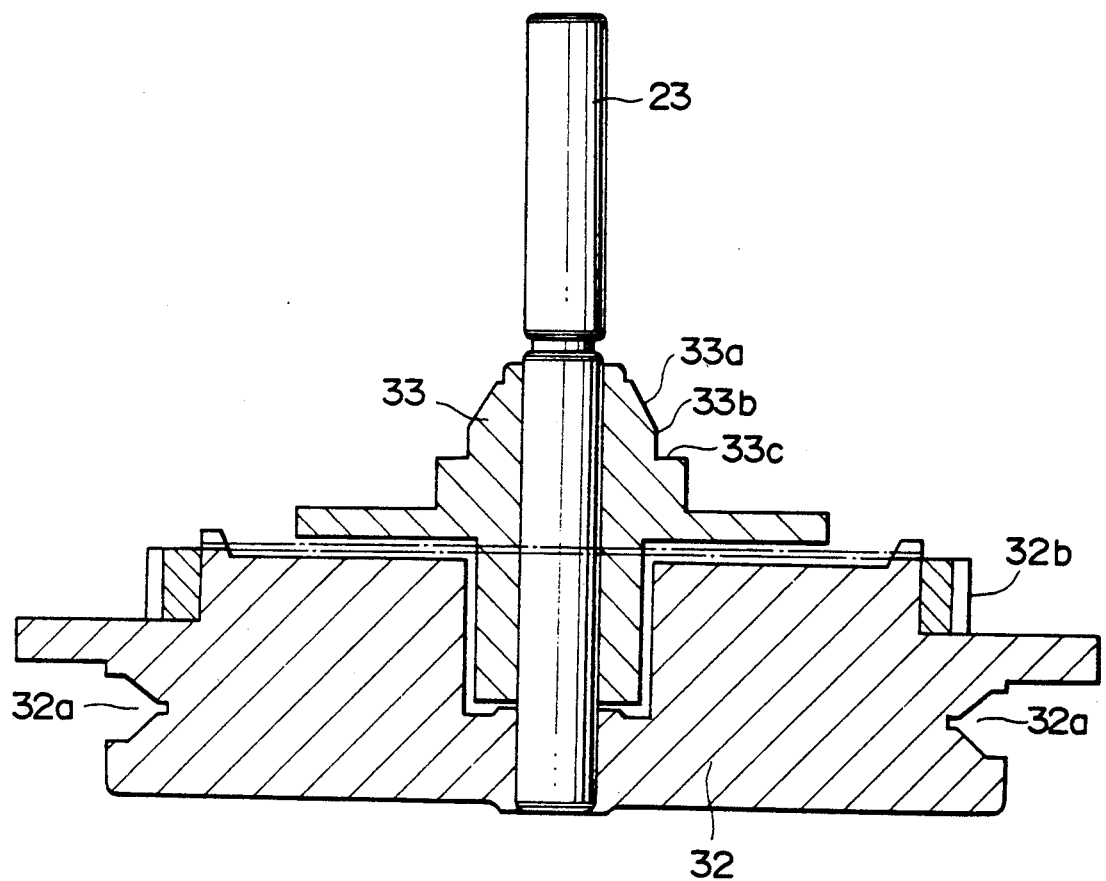

FIG. 6B is a sectional side view of the capstan 23 and the flywheel 32 with its associated parts. Referring to FIG. 6B, the flywheel 32 is provided with a groove 32a for winding the belt 31. A drive gear 32b is mounted on the circumference of the flywheel 32. The capstan 23 is retained in the center of the flywheel 32 and the bearing 33, so that a torque of the motor 30 is transmitted through the belt 31 and the flywheel 32 to the capstan 23.

The bearing 33 has a specific construction such that a flange portion 33a is formed to continue to a cylindrical portion 33b having a diameter so that the cylindrical portion 33b is adapted to contact an inner wall surface of the rectangular guide hole 5b at three points, and a stepped portion 33c is so formed as to abut against the cassette and not to be inserted into the guide hole 5b.

Referring back to FIG. 6A, the drive transmitting system further includes a reduction gear 34 meshing with the drive gear 32b of the flywheel 32, a T-shaped lever 35 pivotably supported at the center of the reduction gear 34, a normal running transmission gear 36 rotatably supported to a first end portion 35a of the T-shaped lever 35, a reverse running transmission gear 37 rotatably supported at a second end portion 35b of the T-shaped lever 35, two reel gears 38 and 39 adapted to mesh with the transmission gears 36 and 37, respectively, and two reel bases 40 and 41 meshing with the reel gears 38 and 39, respectively. With this arrangement, the torque is transmitted from the reduction gear 34 through a clutch 34a to the transmission gears 36 and 37.

Reference numeral 42 denotes a normal/reverse select lever (which will be hereinafter referred to as an NR lever). The NR lever 42 has two elongated holes 42a and 42b, through which two restriction pins 43a and 43b provided on a chassis of the cassette tape player are inserted, respectively. Thus, the NR lever 42 is slidably supported owing to the engagement of the restriction pins 43a and 43b with the elongated holes 42a and 42b. A projection 42c is formed on the NR lever 42, and a torsion coil spring 44 is mounted on the projection 42c. The torsion coil spring 44 is connected to a projection 35c formed at a third end portion of the T-shaped lever 35. Although sliding means for sliding the NR lever 42 is not shown, it may be appropriately designed so that the NR lever 42 can be slid in a direction N responsive to a normal running operation and a direction R responsive to a reverse running operation. For instance, it is considered that the sliding means may have a cam gear or a plunger.

A lever 45 is pivotably supported at 45a, and a gear 46 is rotatably supported at one end portion of the lever 45. The gear 46 meshes with the reduction gear 34. In fast feeding or rewinding the tape, the lever 45 is pivoted about the fulcrum 45a in a direction FR by means of an FF/REW mechanism (not shown) to thereby bring the gear 46 into selective mesh with the reel gear 39 or 38.

FIG. 6C shows an operating condition of the drive transmitting system in the normal running.

When the normal running is selected, the NR lever 42 is slid to a normal position in the direction N. Accordingly, the T-shaped lever 35 connected through the torsion coil spring 44 to the NR lever 42 is rotated in a counterclockwise direction as viewed in FIG. 6C. Accordingly, the transmission gear 36 is brought into mesh with the reel gear 38. As a result, the torque of the motor 30 in a normal direction $N_M$ is transmitted through the belt 31 and the flywheel 32 to the capstan 23, thereby rotating the capstan 23 in a direction $N_C$. At the same time, the torque is transmitted from the drive gear 32b of the flywheel 32 through the reduction gear 34, the clutch 34a and the transmission gear 36 to the reel gear 38. Accordingly, the reel base 40 as a take-up reel in the normal running is rotated in the normal direction.

Figure 6D:
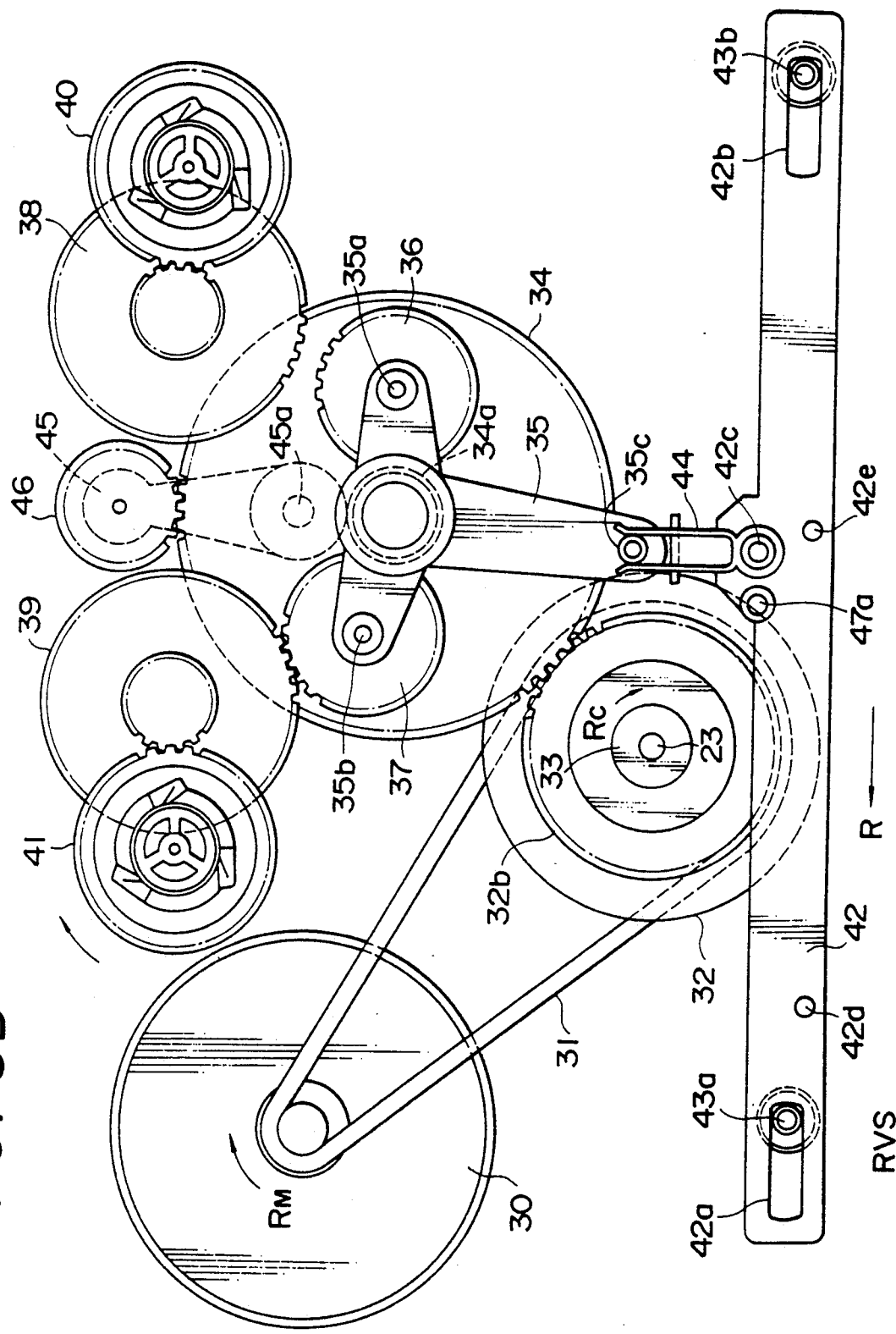

FIG. 6D shows an operating condition of the drive transmitting system in the reverse running.

When the reverse running is selected, the NR lever 42 is slid to a reverse position in the direction R. Accordingly, the T-shaped lever 35 is rotated in a clockwise direction as viewed in FIG. 6D. Accordingly, the transmission gear 37 is brought into mesh with the reel gear 39. As a result, the torque of the motor 30 in a reverse direction $R_M$ is transmitted through the belt 31 and the flywheel 32 to the capstan 23, thereby rotating the capstan 23 in a direction $R_C$. At the same time, the torque is transmitted from the drive gear 32b of the flywheel 32 through the reduction gear 34, the clutch 34a and the transmission gear 37 to the reel gear 39. Accordingly, the reel base 41 as a take-up reel in the reverse running is rotated in the reverse direction.

Now, the head mounting section in the cassette tape player will be described with reference to FIGS. 7A to 10C.

Figure 7B:
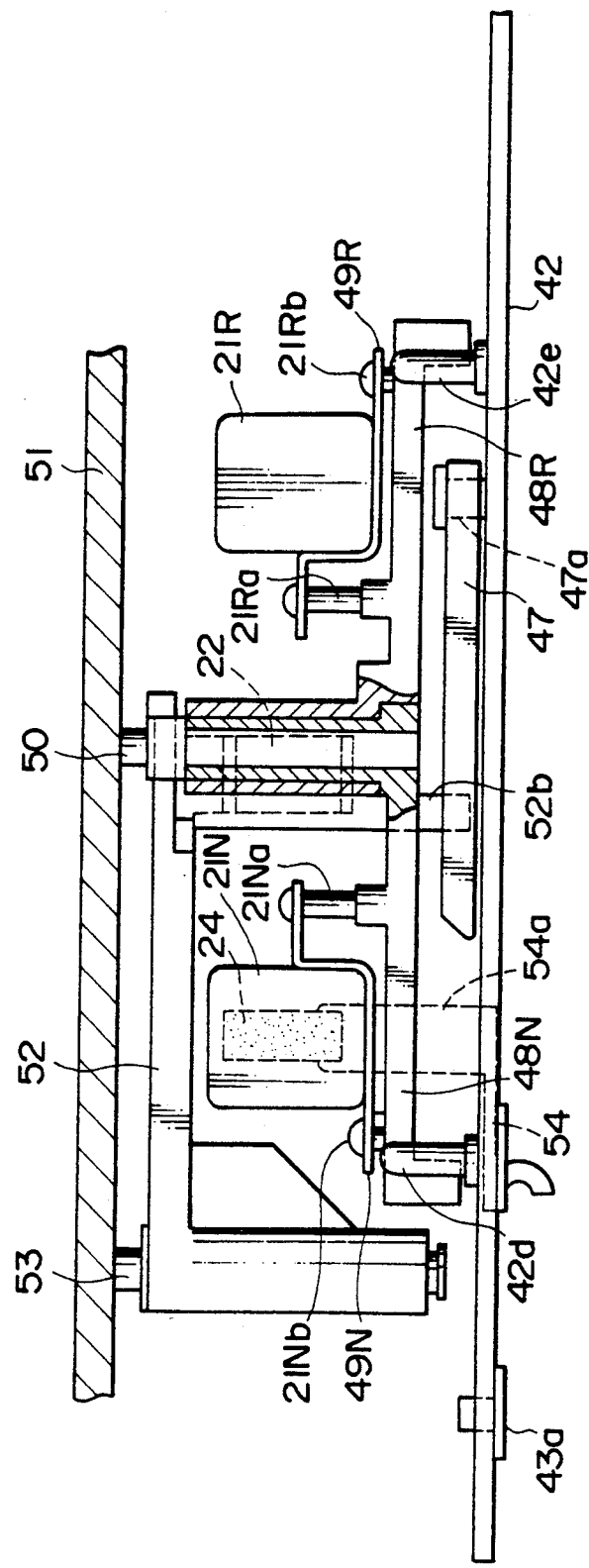
Figure 9A:
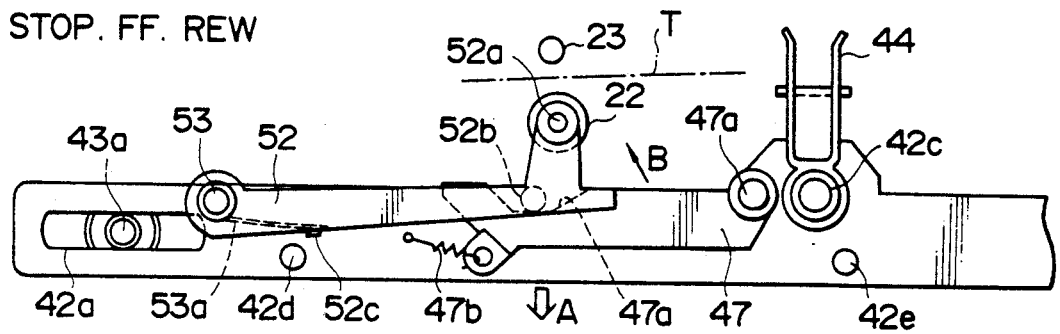
FIGS. 9A to 9C are plan views illustrating the operation of a pinch roller in the head mounting section shown in FIGS. 7A and 7B.
Figure 9B:
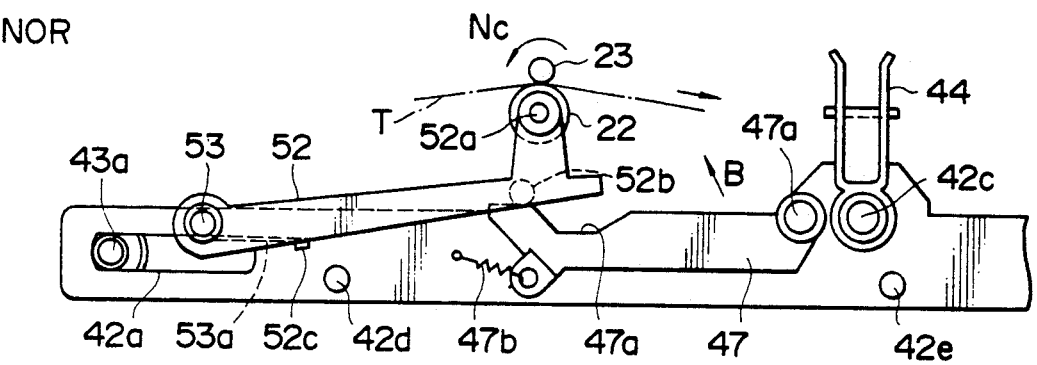
Figure 9C:
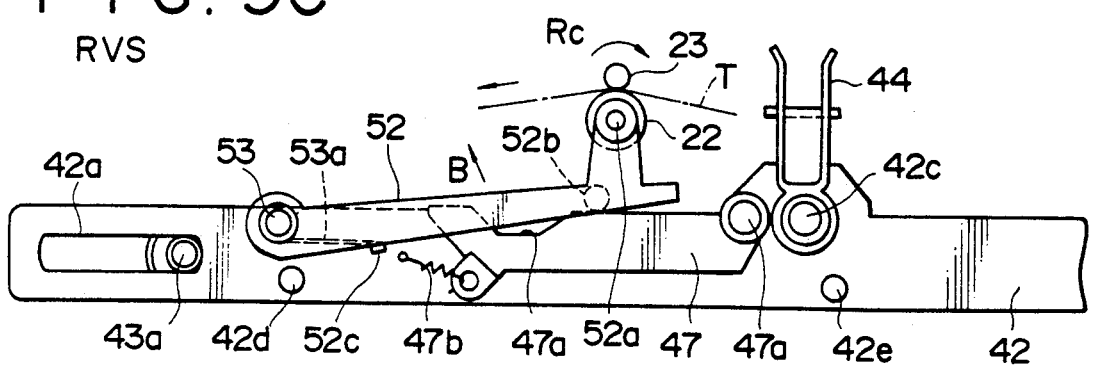

As apparent from FIGS. 7A and 7B, the head mounting section is mounted on the NR lever 42. A pressure lever 47 is pivotably supported at one end thereof through a pivot pin 47a to the NR lever 42. The other end of the pressure lever 47 is biased by a limiter spring 47b in a direction B as shown in FIGS. 9A to 9C. A pivotable range of the pressure lever 47 is limited by a stopper member (not shown) mounted on the chassis. The pressure lever 47 is adapted to slide together with the NR lever 42.

Reference numeral 48N denotes a normal head lever for displacing the normal head 21N to bring same into contact with or retraction from the pad 24 through the tape in the cassette. Similarly, reference numeral 48R denotes a reverse head lever for displacing the reverse head 21R to bring same into contact with or retraction from the pad 6 (not shown in FIGS. 7A to 10C) through the tape in the cassette. The normal head 21N is mounted on a head base 49N (see FIG. 7B) which is supported on the normal head lever 48N by means of supporting members 21Na and 21Nb such as screws. Similarly, the reverse head 21R is mounted on a head base 49R (see FIG. 7B) which is supported on the reverse head lever 48R by means of supporting members 21Ra and 21Rb such as screws. Both the normal head lever 48N and the reverse head lever 48R are pivotably supported on a common shaft 50 extending downwardly from an upper base plate 51.

Reference numeral 52 denotes a pinch lever for displacing the pinch roller 22 to bring same into contact with or retraction from the capstan 23 through the tape in the cassette. The pinch lever 52 is pivotably supported to a shaft 53 extending downwardly from the upper base plate 51. The pinch roller 22 is rotatably supported at a free end portion 52a of the pinch roller 52. Further, as apparent from FIG. 7B, an operating pin 52b extends downwardly from the pinch lever 52 to a position where it contacts a side surface of the pressure lever 47. The pinch roller 22 and the free end portion 52a of the pinch lever 52 are sized so that they can be inserted into the opening 4b of the cassette.

Figure 10A:
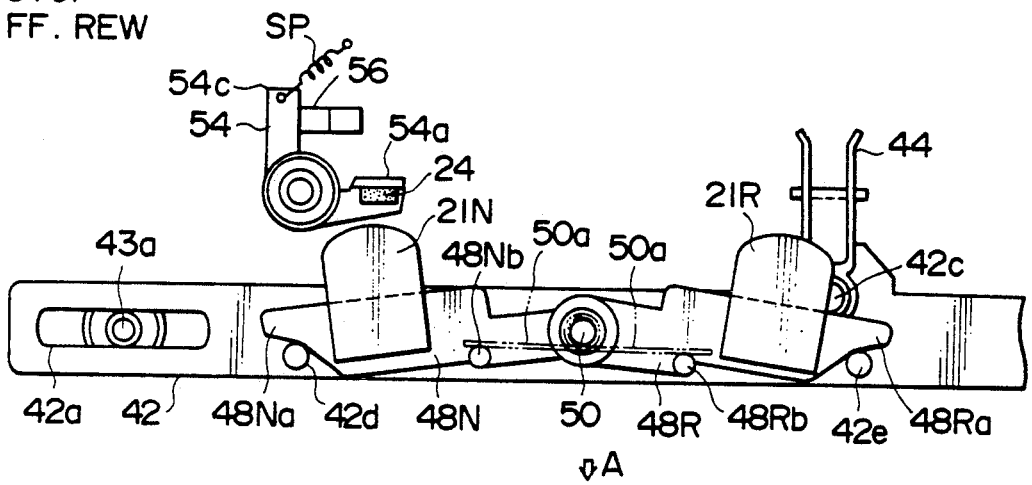
FIGS. 10A to 10C are plan views illustrating the operation of magnetic heads in the head mounting section shown in FIGS. 7A and 7B.
Figure 10B:
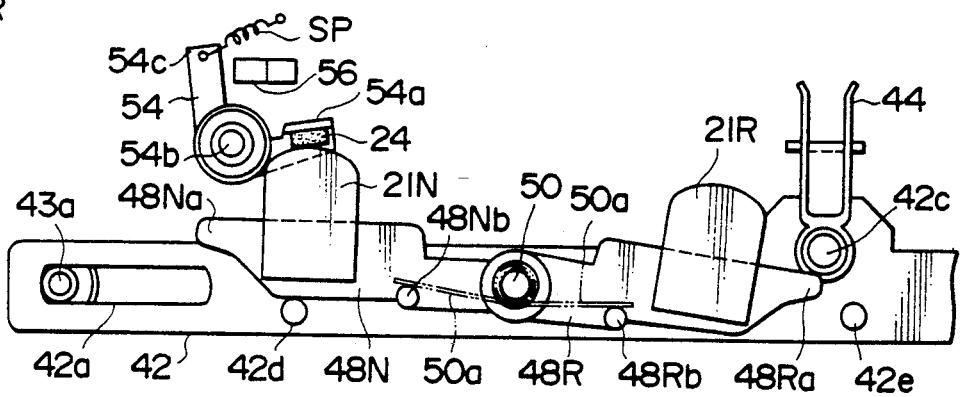
Figure 10C:
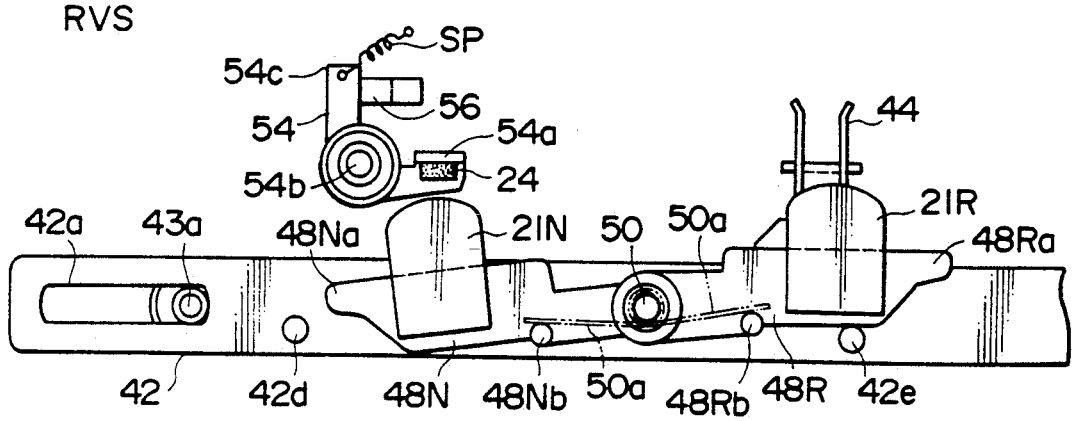

As shown in FIGS. 10A to 10C, the head levers 48N and 48R are provided with projections 48Nb and 48Rb, respectively. Biasing means 50a such as a torsion coil spring is mounted on the pivotal shaft 50 so that two arm portions thereof resiliently abut against the projections 48Nb and 48Rb. Accordingly, free end portions 48Na and 48Ra of the head levers 48N and 48R are biased by the biasing means 50a in a direction A shown in FIG. 10A, i.e., in such a direction as to move away from the pad 24 and the pad 6, respectively.

As shown in FIGS. 9A to 9C, the pinch lever 52 is provided with a projection 52c. A biasing means 53a such as a torsion coil spring is mounted on the pivotal shaft 53 so that an arm portion thereof resiliently abuts against the projection 52c. Accordingly, the free end portion 52a of the pinch lever 52 is biased by the biasing means 53a in the direction A shown in FIG. 9A, i.e., in such a direction as to move away from the capstan 23. A pivotal range of the head levers 48N and 48R and the pinch lever 52 is limited by stopper members (not shown) mounted on the chassis.

Figure 8A:
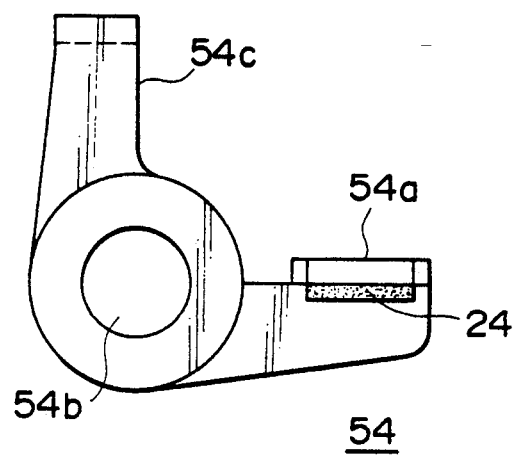
FIGS. 8A and 8B are a plan view and a side view of a pad lever, respectively.
Figure 8B:
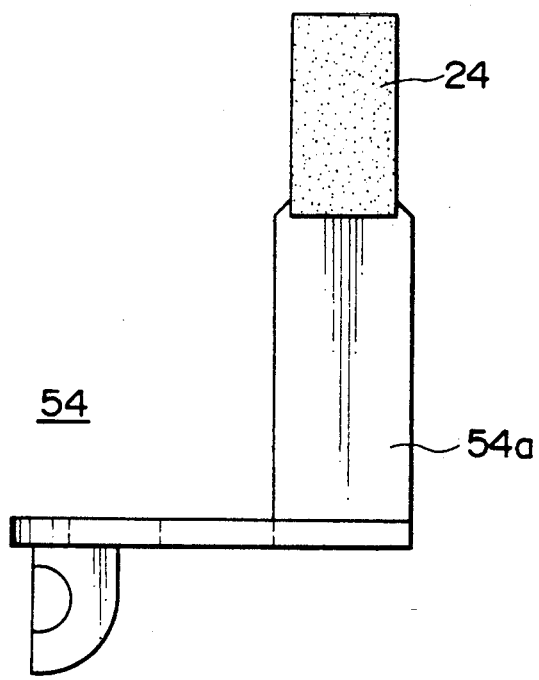

Referring back to FIGS. 7A and 7B, reference numeral 54 denotes a pad lever pivotably supported through a pivot shaft 54b to the chassis. The pad lever 54 is shown in FIGS. 8A and 8B in plan and side elevation, respectively. As apparent from FIGS. 8A and 8B, the pad lever 54 is formed at its one end with a projecting portion 54a extending upwardly. The pad 24 is mounted on the projecting portion 54a at such a position as to face the normal head 21N through the tape. The pad lever 54 is formed of a magnetic shielding material such as permalloy. The projecting portion 54a and the pad 24 are sized and positioned so that they can be inserted into the capstan insert hole 3b of the cassette to be loaded. As shown in FIG. 7A, a biasing means SP such as a spring is connected to the other end 54c of the pad lever 54 so as to normally bias the projecting portion 54a in the direction A. A stopper member 56 is provided so as to stop the other end 54c of the pad lever 54, thereby limiting the rotation of the projecting portion 54a and the pad 24 in the direction A.

The head mounting section is generally constructed as mentioned above, and it is operated to have three conditions, i.e., the normal running condition, the reverse running condition, and a stop condition (which includes a fast feeding condition and a rewinding condition).

The operation of the pinch roller 22 adapted to contact with and retract from the capstan 23 through the tape T will now be described with reference to FIGS. 9A to 9C.

As shown in FIGS. 9A to 9C, the pressure lever 47 is formed with a trapezoidal recess 47a. The pinch lever 52 is normally biased by the torsion coil spring 53a resiliently abutting against the projection 52c to rotate in the direction A away from the capstan 23. Accordingly, in the stop condition shown in FIG. 9A, the operating pin 52b of the pinch lever 52 is received under pressure in the recess 47a of the pressure lever 47, thereby maintaining the pinch roller 22 apart from the capstan 23.

When the NR lever 42 is operated to slide rightwardly from the stop condition shown in FIG. 9A to the normal running condition shown in FIG. 9B, the pressure lever 47 is also moved together with the NR lever 42 in the same direction. As a result, the operating pin 52b is relatively moved to escape from the recess 47a of the pressure lever 47. Accordingly, the pinch lever 52 is rotated in a direction opposite to the direction A to bring the pinch roller 22 into pressure contact with the capstan 23 through the tape T. In the normal running condition, the capstan 23 is rotated in the direction $N_C$ at a constant speed, and the tape T nipped between the pinch roller 22 and the capstan 23 is therefore fed to run in the normal direction at a constant speed.

On the other hand, when the NR lever 42 is operated to slide leftwardly from the stop condition shown in FIG. 9A to the reverse running condition shown in FIG. 9C, the pressure lever 47 is moved together with the NR lever 42 in the same direction. As a result, the operating pin 52b is relatively moved to escape from the recess 47a of the pressure lever 47, and the pinch lever 52 is accordingly rotated in the direction opposite to the direction A, thereby bringing the pinch roller 22 into pressure contact with the capstan 23 through the tape T. In the reverse running condition, the capstan 23 is rotated in the direction $R_C$ at a constant speed. Accordingly, the tape T nipped between the pinch roller 22 and the capstan 23 is fed to run in the reverse direction at a constant speed.

Next, there will be described the operation of the normal head 21N and the reverse head 21R adapted to respectively contact with and retract from the pad 24 and the pad 6 through the tape T with reference to FIGS. 10A to 10C.

As mentioned previously, the head levers 48N and 48R are normally biased by the torsion coil spring 50a in the direction A away from the pads 24 and 6 at a given rotational angle about the pivot shaft 50. Further, two pusher pins 42d and 42e are formed on the NR lever 42. Accordingly, in the stop condition shown in FIG. 10A, the free end portions 48Na and 48Ra of the head levers 48N and 48R resiliently abut against the pusher pins 42d and 42e. In this condition, both the heads 21N and 21R are kept separated from the tape T (not shown in FIG. 10A).

When the NR lever 42 is operated to slide rightwardly from the stop condition shown in FIG. 10A to the normal running condition shown in FIG. 10B, the pusher pins 42d and 42e are moved together with the NR lever 42 in the same direction. During the movement of the pusher pins 42d and 42e, the normal head lever 48N is rotated so as to be pushed by the pusher pin 42d toward the tape T. Accordingly, the normal head 21N is brought into contact with the tape T. At this time, the other pusher pin 42e is disengaged from the reverse head lever 48R, thus having no function for the reverse head 21R. The normal head 21N thus pushed by the pusher pin 42d is inserted into the pinch roller insert hole 2h of the cassette, and is pressed against the pad 24 with the tape T nipped therebetween. Thus, the tape T is nipped between the normal head 21N and the pad 24 to effectuate a reproducing operation in the normal running.

On the other hand, when the NR lever 42 is operated to slide leftwardly from the stop condition shown in FIG. 10A to the reverse running condition shown in FIG. 10C, the pusher pins 42d and 42e are moved together with the NR lever 42 in the same direction. Accordingly, the reverse head lever 48R is rotated so as to be pushed by the pusher pin 42e toward the tape T, and the reverse head 21R is therefore brought into contact with the tape T. At this time, the other pusher pin 42d is disengaged from the normal head lever 48N, thus having no function for the normal head 21N. The reverse head 21R thus pushed by the pusher pin 42e is inserted into the magnetic head insert hole 1 of the cassette, and is pressed against the pad 6 with the tape T nipped therebetween. Thus, the tape T is nipped between the reverse head 21R and the pad 6 to effectuate a reproducing operation in the reverse running.

FIGS. 11A and 11B show a positional relation between the head mounting section of the cassette tape player according to the preferred embodiment and the cassette loaded thereinto (in the reverse running condition, for example).

Figure 12:
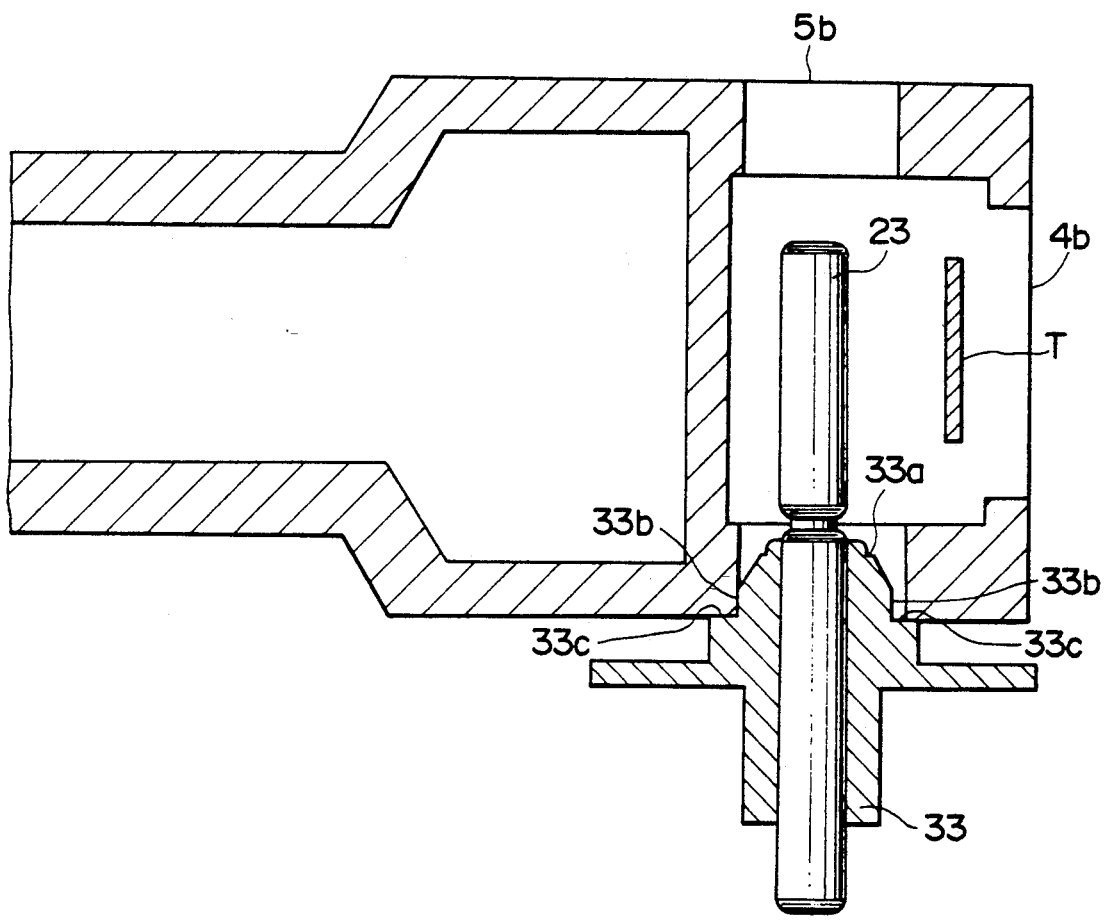
FIG. 12 is a sectional side view of a bearing functioning as a guide member for the cassette.

As apparent from FIGS. 11A and 11B, when the cassette is loaded, the capstan 23 is inserted into the guide hole 5b of the cassette, and the guide projection 26 similar to that in the conventional cassette tape player is engaged with the other guide hole 5a of the cassette. The positioning of the cassette with respect to the capstan 23 is effected by contacting the cylindrical portion 33b of the bearing 33 for the capstan 23, which portion 33b has the same diameter as that of the guide projection 26, with the inner wall surface of the rectangular guide hole 5b at three points. That is, referring to FIG. 12, the cylindrical portion 33b of the bearing 33 is in contact with the inner wall surface of the guide hole 5b at three points except the side closest to the opening 4b.

Further, the pad 24 mounted on the projecting portion 54a of the pad lever 54 is inserted into the capstan insert hole 3b of the cassette. The other capstan insert hole 3a is not used in this preferred embodiment.

The reverse head 21R is inserted into the magnetic head insert opening 1, and alternatively the normal head 21N is inserted into the pinch roller insert opening 2b. The pinch roller 22 is inserted into the opening 4b. The other pinch roller insert opening 2a and the other opening 4a are not used in this preferred embodiment.

As mentioned above, the capstan 23 is inserted into the guide hole 5b in this preferred embodiment, and the two reproducing heads are located on opposite sides of the capstan 23 so that they may selectively function to carry out a reproducing operation in the normal running or the reverse running. Moreover, irrespective of the normal running or the reverse running, the reproducing head functioning during the reproducing operation is always located on the side of a supply reel supplying the tape T upstream of the capstan 23.

In other words, the capstan 23 operates to always draw the tape T contacting the reproducing head (the normal head 21N or the reverse head 21R) at a constant speed from the side of a take-up reel winding the tape T. Therefore, the tape T can be fed to run always stably irrespective of the normal running or the reverse running. Thus, the problem of unstable reverse running of the tape in the conventional single capstan reversible type cassette tape player can be eliminated to make such tape players practically applicable.

Accordingly, various advantages of a single capstan reversible type such as low cost, low power consumption, lightness in weight, and compactness can be actually embodied. In particular, it can be preferably applied to a portable cassette tape player.

The bearing 33 for the capstan 23 is so shaped as to be guided by the guide hole 5b upon insertion of the capstan 23 into the guide hole 5b. Thus, the cassette can be kept in a stable position even by inserting the capstan 23 into the guide hole 5b rather than the capstan insert hole. Accordingly, there does not occur any adverse effect due to instability of a cassette position, such as a fluctuation in output level, a reduction in azimuth characteristics, or an increase in wow and flutter, thereby providing stable performance and putting the head mounting section of the single capstan reversible type cassette tape player into practical use with the capstan 23 inserted into the guide hole 5b.

Further, two reproducing heads are provided in this preferred embodiment, and one of them (the normal head 21N) is inserted into the pinch roller insert opening 2b of the cassette although a pad and a shielding plate are not provided. However, at the same time the cassette is loaded, the pad 24 provided in the head mounting section of the cassette tape player is inserted into the capstan insert hole 3b, and the normal head 21N is adapted to be pressed against the pad 24 through the tape T. Accordingly, acceptable head pressure of the normal head 21N as well as the reverse head 21R with respect to the tape T can be obtained, thereby eliminating problems due to an unstable head pressure during the reproducing operation in the normal running direction, such as a fluctuation in output level, a reduction in azimuth characteristics, or an increase in wow and flutter.

Additionally, since the pad lever 54 is made of a magnetic shielding material such as permalloy, a shielding effect to the normal head 21N can be obtained.

In this preferred embodiment, a single capstan is provided to simplify the construction of the drive transmitting system, which is very advantageous from the viewpoints of wow/flutter and speed deviation.

In general, the position of the guide hole 5b of the cassette is deeper than the position of the capstan insert hole 3b by about 1.5 mm. Accordingly, by inserting the capstan 23 into the guide hole 5b, a center position of the capstan 23 can be shifted deeper by about 1.5 mm as compared with the conventional cassette tape player. This means that a diameter of the flywheel 32 can be made larger by about 3 mm than that of a flywheel in the conventional cassette tape player, thereby improving the moment of inertia of the flywheel 32.

Further, as apparent from FIGS. 11A and 11B, the head mounting section of the cassette player occupies only one left half of the area opposing the cassette. Accordingly, in the housing portion of the cassette tape player corresponding to the other half of the cassette, a degree of freedom in design or mechanical design can be widely improved.

Although the drive transmitting system in this preferred embodiment is of a belt drive type as shown in FIGS. 6A to 6D, it may be of a direct drive type such that the flywheel is adapted to be rotated directly by a motor shaft.

Further, it should be appreciated that the correspondence of the holes and the openings of the cassette to the heads and the other elements of the cassette tape player is not limited to the preferred embodiments shown in FIGS. 5A and 5B. For example, the normal head and the reverse head may be inserted into the pinch roller insert openings 2a and 2b without using the magnetic head insert opening 1. In any case, it is necessary that the bearing for the capstan is so shaped as to guide the capstan inserted into the guide hole 5a or 5b. Further, it is also necessary that a head pad mechanism is provided so as to cooperate with the magnetic head to be inserted into the pinch roller opening rather than the magnetic head insert opening 1.

While the above description of the preferred embodiment has been directed to a single capstan reversible type cassette tape player it should be appreciated that the present invention may be applied to an irreversible one-way type or a dual capstan reversible type having two capstans for normal running and reverse running, provided that the head mounting section is constructed so that a magnetic head is to be inserted into any opening other than the magnetic head insert hole 1 of the cassette.

What is claimed is:

1. A cassette tape player for recording and/or reproducing a tape housed in a conventional audio cassette having two capstan insert holes, two guide pin holes formed between the two capstan insert holes, two pinch roller insert openings respectively contiguous to the two capstan insert holes, two erase openings respectively contiguous to the two guide pin holes, and a magnetic head insert opening formed midway between the two erase openings that are between the two pinch roller insert openings, the tape player comprising:

means for selecting normal or reverse running of the tape;

a reversibly rotatable capstan for insertion into one of the two guide pin holes formed between the two capstan insert holes;

a pinch roller connected to said means for selecting for insertion through one of the two erase openings corresponding to the guide pin hole into which said capstan is inserted;

a first magnetic head connected to said means for selecting and arranged on a first side of said pinch roller for use in normal running of the tape for insertion through one of the pinch roller insert openings so that said first magnetic head is located on a supply reel side upstream of said capstan in the normal running; and a second magnetic head connected to said means for selecting and arranged on a second side of said pinch roller opposite said first side for use in reverse running of the tape for insertion through the magnetic head insert opening so that said second magnetic head is located on a supply reel side upstream of said capstan in the reverse running.

2. The cassette tape player as defined in claim 1 further comprising a bearing for supporting said capstan in the cassette tape player, said bearing having a size and shape substantially the same as a size and shape of the guide pin hole for positioning the cassette in the tape player.

3. The cassette tape player as defined in claim 1 further comprising a head pad for insertion into one of the two capstan insert holes corresponding to the pinch roller insert opening through which said first magnetic head is inserted; and a head pad lever for pivotably mounting said head pad to the cassette tape player.

4. The cassette tape player as defined in claim 3, wherein said head pad lever is formed of a magnetic shielding material.

* * * * *